United States Patent
Park et al.

(10) Patent No.: US 10,064,069 B2
(45) Date of Patent: Aug. 28, 2018

(54) METHOD AND APPARATUS FOR SETTING BEAM IN MOBILE COMMUNICATION SYSTEM

(71) Applicants: Samsung Electronics Co., Ltd., Gyeonggi-do (KR); Korea Advanced Institute of Science and Technology, Daejeon (KR)

(72) Inventors: Sung-Jin Park, Gyeonggi-do (KR); Min-Hoe Kim, Daejeon (KR); Dong-Ho Cho, Seoul (KR); Sun-Heui Ryoo, Gyeonggi-do (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 298 days.

(21) Appl. No.: 14/839,751

(22) Filed: Aug. 28, 2015

(65) Prior Publication Data

US 2016/0066197 A1 Mar. 3, 2016

(30) Foreign Application Priority Data

Aug. 28, 2014 (KR) .................. 10-2014-0112984

(51) Int. Cl.
| | |
|---|---|
| *H04W 4/00* | (2018.01) |
| *H04W 16/28* | (2009.01) |
| *H04B 7/06* | (2006.01) |
| *H04B 7/08* | (2006.01) |
| *H04W 52/50* | (2009.01) |

(52) U.S. Cl.
CPC .......... *H04W 16/28* (2013.01); *H04B 7/0617* (2013.01); *H04B 7/086* (2013.01); *H04W 52/50* (2013.01)

(58) Field of Classification Search
CPC ... H04W 16/28; H04W 7/0617; H04W 7/086; H04W 52/50
See application file for complete search history.

(56) References Cited

U.S. PATENT DOCUMENTS

| | | | |
|---|---|---|---|
| 7,652,624 B2 | 1/2010 | Li et al. | |
| 8,996,066 B1* | 3/2015 | Lee ...................... | H04W 16/28 370/334 |
| 2008/0171516 A1* | 7/2008 | Kakura ................. | H04B 7/086 455/63.4 |
| 2008/0218413 A1 | 9/2008 | Li et al. | |
| 2009/0175161 A1* | 7/2009 | Yi ........................ | H04B 7/0617 370/210 |

(Continued)

FOREIGN PATENT DOCUMENTS

| | | |
|---|---|---|
| KR | 20090096476 A | 9/2009 |
| KR | 20140009046 A | 1/2014 |

*Primary Examiner* — Maharishi V Khirodhar

(57) ABSTRACT

A method for setting a beam in a mobile communication system includes determining at least one of a beam width and a beam direction in consideration of a criteria value in response to a failure of a random access attempt, and retransmitting a beam based on the determined at least one of the beam width or the beam direction. The criteria value includes at least one of a beam gain history of a candidate beam combination and a previous transmission failure history.

18 Claims, 10 Drawing Sheets

(56) References Cited

U.S. PATENT DOCUMENTS

| | | | |
|---|---|---|---|
| 2013/0040684 A1* | 2/2013 | Yu | H04B 7/0617 455/517 |
| 2013/0102345 A1* | 4/2013 | Jung | H04B 7/0456 455/513 |
| 2013/0201938 A1* | 8/2013 | Seol | H04W 72/1284 370/329 |
| 2014/0016573 A1 | 1/2014 | Nuggehaili et al. | |

* cited by examiner

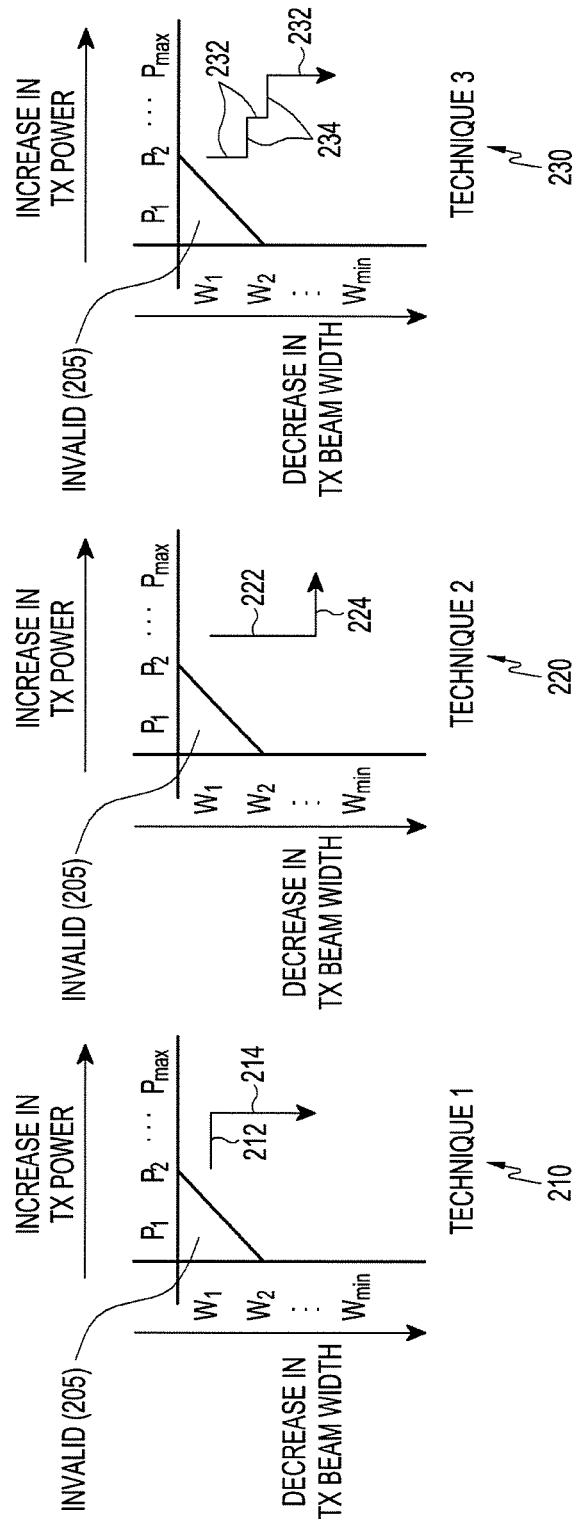

METHOD AND APPARATUS FOR SETTING BEAM IN MOBILE COMMUNICATION SYSTEM

CROSS-REFERENCE TO RELATED APPLICATION AND CLAIM OF PRIORITY

The present application is related to and claims benefit under 35 U.S.C. § 119(a) of a Korean patent application filed in the Korean Intellectual Property Office on Aug. 28, 2014 and assigned Serial No. 10-2014-0112984, the entire disclosure of which is incorporated herein by reference.

TECHNICAL FIELD

The present disclosure relates to a method and apparatus for setting a beam in a mobile communication system.

BACKGROUND

To meet the demand for wireless data traffic having increased since deployment of 4G communication systems, efforts have been made to develop an improved 5G or pre-5G communication system. Therefore, the 5G or pre-50 communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A mobile communication system in the mmWave band may suffer an increase in propagation loss such as path loss and return loss due to the frequency characteristics of the extremely high frequency band. As a result, the reach of the radio waves may be reduced, causing a decrease in the service area or the coverage. On the other hand, the wavelength is very short due to the extremely high frequency, so it is easy to apply beamforming in which a plurality of small antennas are used. For the control of the directivity and interference, which are the propagation characteristics of the mmWave band, the beamforming technology may be used. Using a multi-array antenna, not only a base station but also a terminal may generate a beam having a particular angle and width to communicate with each other.

The main difference with the existing cellular system that uses sector beams may consist in that deafness occurs due to the displacement of the beam. For example, in a case where a base station generates a transmission beam to communicate with a terminal, if the terminal uses an omnidirectional antenna as in the prior art without using beamforming, the terminal may have no problem during reception. However, in a case where the terminal uses beamforming, if a reception beam of the terminal does not match a transmission beam of the base station, the antenna gain may significantly fall, so the communication may be almost impossible. On the contrary, even in a case where the terminal generates a transmission beam, similarly, if a reception beam of the base station does not match a transmission beam of the terminal, the communication may be difficult.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below To address the above-discussed deficiencies, it is a primary object to provide a beam setting method and apparatus in a mobile communication system, in which not only a transmitter but also a receiver adaptively adjusts the direction and width of a beam, during retransmission in the mobile communication system that uses mmWave.

Another aspect of various embodiments of the present disclosure is to provide abeam setting method and apparatus in a mobile communication system, which increases the retransmission success probability by adjusting the beam so as to increase the beam gain, during retransmission in the mobile communication system that uses mmWave.

In accordance with an aspect of the present disclosure, there is provided a method for setting a beam in a mobile communication system. The method may include changing at least one of a beam width and a beam direction in consideration of a criteria value in response to a failure of a random access attempt, and retransmitting the beam. The criteria value may include at least one of a beam gain history of a candidate beam combination and a previous transmission failure history.

In accordance with another aspect of the present disclosure, there is provided an apparatus for setting a beam in a mobile communication system. The apparatus may include a controller configured to change at least one of a beam width and abeam direction in consideration of a criteria value in response to a failure of a random access attempt, and retransmit the beam. The criteria value may include at least one of a beam gain history of a candidate beam combination and a previous transmission failure history.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A, 2B to 2C illustrate first, second and third retransmission techniques;

Throughout the drawings, like reference numerals will be understood to refer to like parts, components, and structures.

DETAILED DESCRIPTION

Figure 1:
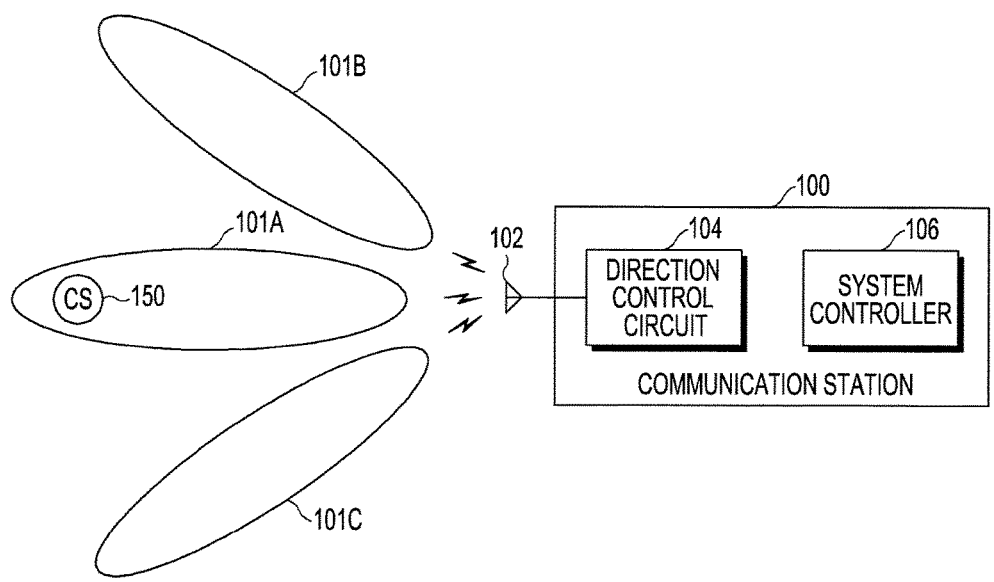
FIG. 1 is a block diagram illustrating a configuration of a communication station.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, embodiments of the present disclosure are described with reference to the accompanying drawings. Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The beam setting method that has been considered in the existing prior arts may be as follows.

A first existing prior art proposes a method for quickly recovering the link if the packet transmission fails due to the link instability, and the proposed method will be described in detail with reference to FIG. 1.

FIG. 1 is a block diagram illustrating a configuration of a communication station.

A communication station 100 communicates with one or more other communication stations such as a communication station (CS) 150, using a directional antenna 102. The communication station 100 includes a direction control circuit 104 coupled to the directional antenna 102, in order to transmit packets in one of directions 101A, 101B and 101C, for reception by the communication station 150. The communication station 100 can also include a system controller 106 for selecting and/or determining the transmission and reception directions by means of the directional antenna 102. Any one of the communication station 100 or the communication station 150 can operate as a transmitting station, and any one of the communication station 100 or the communication station 150 can operate as a receiving station.

If no acknowledgement is received from a receiving station even after a number of retransmission attempts, a transmitting station can retransmit the packet in an adjacent direction. Further, if a receiving station fails to receive a packet from a transmitting station even after a number of failed reservations, the receiving station can change the reception direction to an adjacent direction. In other words, the transmitting station and the receiving station can change the beam transmission/reception direction to an adjacent direction, if the transmitting station and the receiving station fail in communication even after a number of retransmission attempts.

A second existing prior art proposes a scheme in which a transmitter adjusts a power level of a transmission beam or a width of a transmission beam even in a random access situation other than a retransmission situation, and the proposed scheme will be described in detail with reference to FIGS. 2A to 2C.

FIGS. 2A to 2C illustrates first, second and third retransmission techniques.

In FIGS. 2A through 2C, an invalid area 205 identifies a combination of a Tx power and a Tx beam width in a case where the Tx power is too low and the Tx beam width is too wide to achieve a successful random access.

In the first retransmission technique 210, if random access is not successful, a terminal can attempt retransmission by first boosting its Tx power 212 by ΔP through successive iterations, and the terminal can continue the boosting until the random access is achieved or the Tx power reaches a threshold level $P_{max}$. A threshold Tx power level can be a maximum power level, or can be a predetermined power level or a specified power level. Thereafter, if the random access is still not achieved, the terminal can reduce a Tx beam width 214 by ΔW through successive iterations, and the terminal can continue the reduction of the Tx beam width until the random access is achieved or the Tx beam width reaches a threshold level $W_{min}$. A threshold Tx beam width level can be a minimum beam width level, or can be a predetermined beam width level or a specified beam width level. In the second retransmission technique 220, if random access is not successful, the terminal can attempt retransmission by first reducing its Tx beam width 222 by ΔW through successive iterations, and the terminal can continue the reduction of the Tx beam width until the random access is achieved or the Tx beam width reaches a threshold level $W_{min}$. A threshold Tx beam width level can be a minimum beam width level, or can be a predetermined beam width level or a specified beam width level. Thereafter, if the random access is still not achieved, the terminal can boost its Tx power 224 by ΔP through successive iterations, and the terminal can continue the boosting until the random access is achieved or the Tx power reaches a threshold level $P_{max}$. A threshold Tx power level can be a maximum power level, or can be a predetermined power level or a specified power level.

In the third retransmission technique 230, if random access is not successful, the terminal can attempt retransmission by boosting its Tx power and reducing its Tx beam width through successive iterations. For example, in first retransmission attempt, the terminal can reduce its Tx beam width 232. If the random access is not successful, the terminal can reattempt the random access by boosting its Tx power 234. The terminal can continuously reduce its Tx beam width 232 by ΔW and continuously boost its Tx power 234 by ΔP through successive iterations, and the terminal can continue the reduction and the boosting until the random access is achieved, the Tx beam width reaches a threshold level $W_{min}$, or the Tx power reaches a threshold level $P_{max}$.

In the environment where mmWave beamforming is used, in response to the failure of a random access channel, it is possible to change at least one of a transmission power level and a transmission beam width within an effective reconnection time and reflect the changed results when re-attempting the random access.

The above-described prior arts mainly propose a scheme for performing retransmission in view of a transmitter. In other words, the prior arts have been proposed based on performing retransmission with a beam that has a different direction or a different beam width from that of the first transmitted beam. Even the beam change scheme that is considered by a receiver is nothing but simply changing the direction of the beam to the direction of a neighboring beam.

Therefore, there is a need for a scheme of adaptively changing the transmission/reception beam characteristics depending on the environment during retransmission.

The present disclosure proposes an effective solution to the retransmission scheme between a terminal and a base station, which can be a problem in a mobile communication system that uses mmWave. Specifically, during retransmission, not only a transmitter but also a receiver can adaptively adjust the direction and width of a beam, thereby improving the retransmission effect.

Further, the present disclosure provides a method for selecting a retransmission beam by which a terminal and abuse station will communicate with each other during retransmission, and the beam direction and beam width of a retransmission transmission/reception beam can be adjusted considering a beam gain history of a candidate beam combination, a previous transmission failure history, mobility and the like. Considering various channel characteristics of the mmWave band, it is possible to ensure an increase in the retransmission success probability.

Figure 3A:
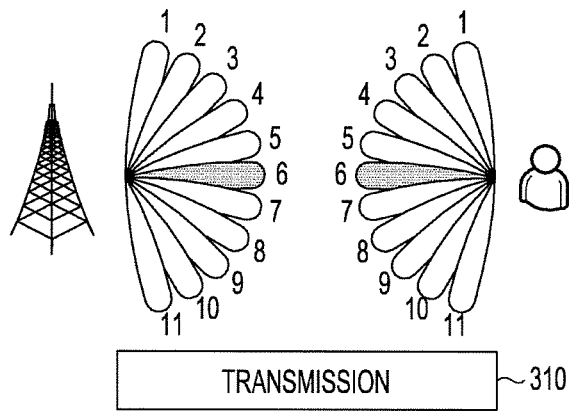
FIGS. 3A, 3B to 3C illustrate a retransmission beam setting method according to a first embodiment of the present disclosure.
Figure 3B:
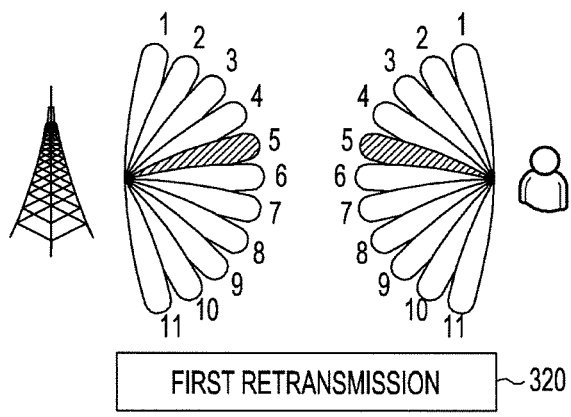
Figure 3C:
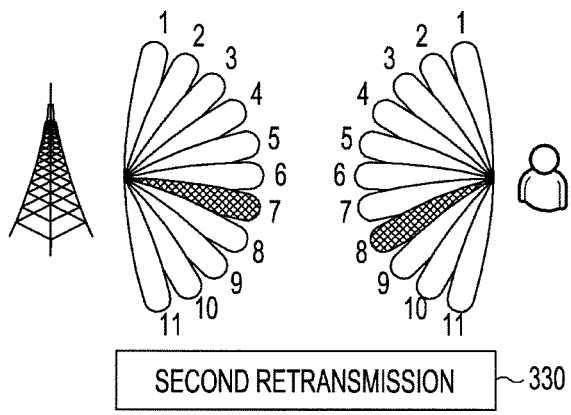

FIGS. 3A to 3C illustrate a retransmission beam setting method according to a first embodiment of the present disclosure.

In case of FIGS. 3A to 3C, retransmission is provided by changing only the direction without the change in the width of the transmission/reception beam used for retransmission.

Before transmission/retransmission of a transmission/reception beam, a candidate transmission/reception beam can be selected through scanning of a transmission/reception beam. In this process, a received signal strength can be estimated depending on the direction of a transmission/reception beam, and a retransmission beam can be selected based on the received signal strength.

For example, in a transmission phase 310, a beam can be transmitted in a transmission beam with ID=6 and a reception beam with ID=6. In a first retransmission phase 320, a beam can be transmitted in a transmission beam with ID=5 and a reception beam with ID=5. In a second retransmission phase 330, a beam can be transmitted in a transmission beam with ID=7 and a reception beam with ID=8.

As a result, if a beam's received signal strength is higher in order of 6 (Tx beam ID)—6 (Rx beam ID)=>5 (Tx beam ID)—5 (Rx beam ID)=>7 (Tx beam ID)—8 (Rx beam ID), a transmitter and a receiver can transmit the beam at transmission time and each retransmission time.

Each of the transmitter and the receiver can operate by storing information about only the beam direction in which it should transmit at each time point regardless of the change in the beam direction of the opponent.

Figure 4A:
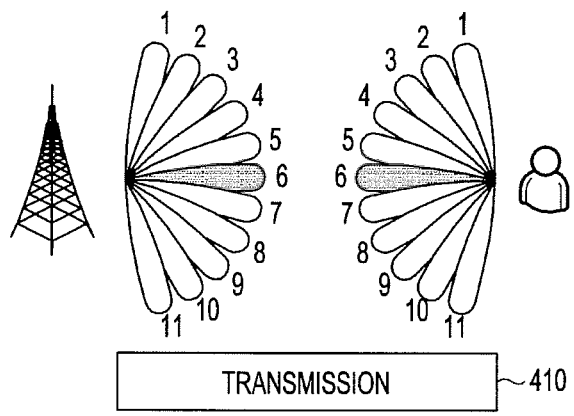
FIGS. 4A, 4B to 4C illustrate a retransmission beam setting method according to a second embodiment of the present disclosure.
Figure 4B:
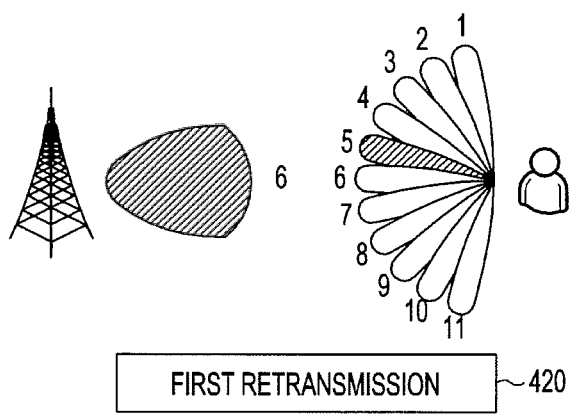
Figure 4C:
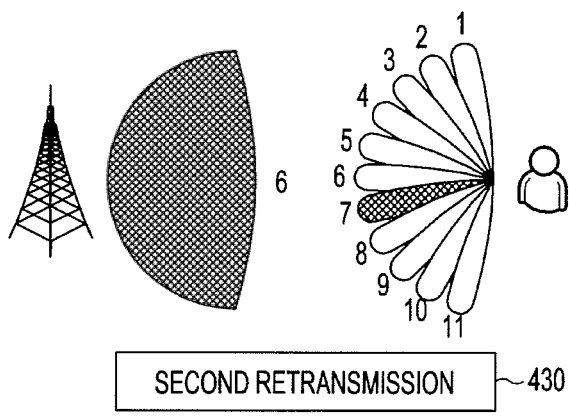

FIGS. 4A to 4C illustrate a retransmission beam setting method according to a second embodiment of the present disclosure.

In case of FIGS. 4A to 4C, a beam width of a transmission (reception) beam is changed (and a beam direction thereof is fixed) and at the same time, a beam direction of a reception (transmission) beam is changed (and a beam width thereof is fixed).

For example, in a transmission phase 410, a beam can be transmitted in a transmission beam with ID=6 and a reception beam with ID=6. In a first retransmission phase 420, a beam can be transmitted in a transmission beam with ID=6 and a reception beam with ID=5. In a second retransmission phase 430, a beam can be transmitted in a transmission beam with ID=6 and a reception beam with ID=7. In this case, during retransmission, a transmitter (receiver) can change the retransmission beam width and a receiver (transmitter) can change the retransmission beam direction, thereby setting a retransmission transmission/reception beam.

In other words, its retransmission beam direction is fixed to be the same as the transmission beam direction, and the transmitter (receiver) can set a retransmission beam by setting the beam width to be wider than before, during retransmission. In this case, the transmitter (receiver) can determine how wide it will set the beam width, depending on the antenna array and the number of antennas.

Its retransmission beam width is set to be the same as the transmission beam width, and the receiver (transmitter) can randomly set one of adjacent candidate beams on the basis of the retransmission beam direction as a transmission beam direction, thereby setting a retransmission beam. In this case, the same beam direction can be selected.

Figure 5A:
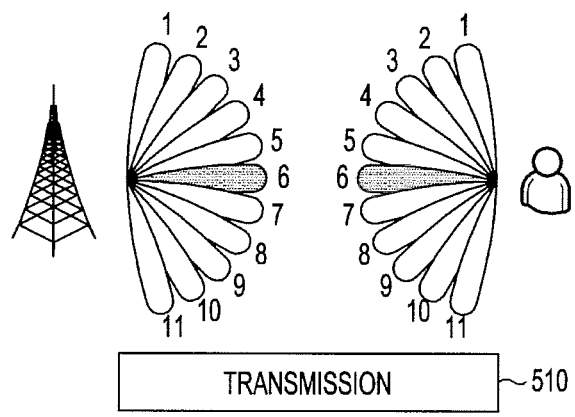
FIGS. 5A, 5B to 5C illustrate a retransmission beam setting method according to a third embodiment of the present disclosure.
Figure 5B:
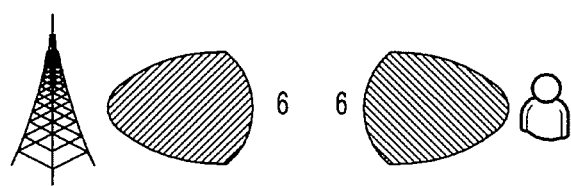
Figure 5C:
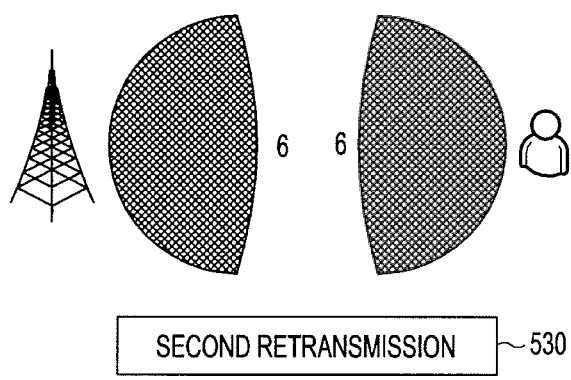

FIGS. 5A to 5C illustrate a retransmission beam setting method according to a third embodiment of the present disclosure.

In case of FIGS. 5A to 5C, a beam width of a transmission beam is changed (and a beam direction thereof is fixed) and at the same time, a beam width of a reception beam is changed (and a beam direction thereof is fixed).

For example, in a transmission phase 510, a beam can be transmitted in a transmission beam with ID=6 and a reception beam with ID=6. In a first retransmission phase 520, a beam can be transmitted in a transmission beam with ID=6 and a reception beam with ID=6. In a second retransmission phase 530, a beam can be transmitted in a transmission beam with ID=6 and a reception beam with ID=6. In this case, the beam direction is fixed.

During retransmission, a retransmission beam can be set by changing a transmission/reception beam width without the change in the transmission/reception beam direction. In other words, when the transmitter and the receiver are both in transmission, retransmission can be performed by setting a beam width that is wider than before, while using the same beam direction. Both of the transmitter and the receiver can be set to be the same as or different from in terms of an increment of the beam width. As a possible embodiment, a retransmission beam can be set through the change in the transmission/reception beam width. The transmitter (receiver) and the receiver (transmitter) can determine how wide they will set the beam width, depending on the antenna array and the number of antennas.

Figure 6:
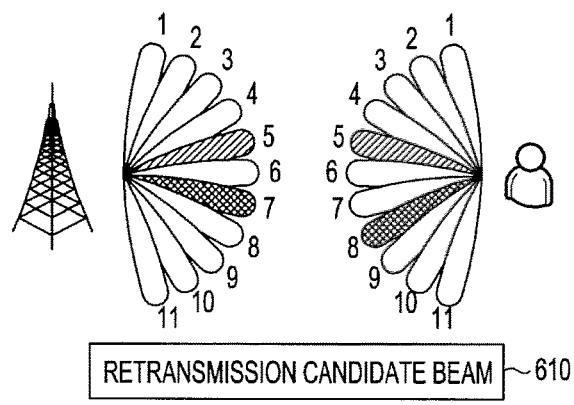
FIG. 6 illustrates how to set a retransmission candidate beam, to which the first to third embodiments of the present disclosure can be applied.

FIG. 6 illustrates how to set a retransmission candidate beam, to which the first to third embodiments of the present disclosure can be applied.

As to a method for setting a retransmission candidate beam from the viewpoint of a receiver (transmitter), the following two methods are possible.

1. Method for Changing Beam Direction

In the method for changing the beam direction according to an embodiment of the present disclosure, although the beam gain (or data rate) can be expected, the matching probability between the reception beam and the transmission beam can be low.

2. Method for Changing Beam Width

As the beam gain according to an embodiment of the present disclosure is higher, the formed beam width is narrower, and as the beam gain is lower, the formed beam width is wider. Therefore, in the method for changing the beam width, although the beam gain (or data rate) cannot be expected, the matching probability between the reception beam and the transmission beam can be high.

First, as to the criteria for determining a change in the beam direction or the beam width in the receiver, there can be the following three criteria. In an embodiment of the present disclosure, a beam gain history of a candidate beam combination, a previous transmission failure history, mobility and the like can be the criteria for determining a change in the beam direction or the beam width. Both of the beam gain history of a candidate beam combination and the previous transmission failure history can be available if there is a correlation between transmission and retransmission (e.g., if there is almost no mobility of the terminal).

Therefore, it is necessary to determine a change in the beam direction and/or the beam width by comprehensively determining the metric of each beam.

Second, the criteria for determining a change in the beam direction or the beam width in the transmitter can include all of the beam gain history of a candidate beam combination, the previous transmission failure history, the mobility and the like. In addition, the beam direction or the beam width can be changed in consideration of the maximum allowable transmission beam width serviceable in the receiver.

Next, four criteria A to D for determining the beam width and the beam direction will be described.

Criteria A: Beam Gain History of Candidate Beam Combination

FIG. 6 illustrates an example of a beam setting method according to an embodiment of the present disclosure.

A beam gain of a combination of candidate beams, i.e., a transmission beam with ID=5 and a reception beam with ID=5 is assumed to be, for example, 0.3. It is determined whether the beam gain of a combination of candidate beams is greater than a threshold. If the beam gain of a combination of candidate beams is greater than the threshold, the beam direction can be changed.

As shown in FIG. 6, in a case where the past beam gain corresponding to beams (transmission beam with ID=5—reception beam with ID=5) among retransmission candidate beams 610 is 0.3 and the past beam gain corresponding to beams (transmission beam with ID=7—reception beam with ID=8) among the retransmission candidate beams 610 is 0.2, since the past beam gain of the retransmission candidate beams is not good, the proposed beam setting method can exclude a case where both the transmitter and the receiver change only the beam direction as shown in FIGS. 3A to 3C during setting of the retransmission candidate beams 610.

Criteria B: Previous Transmission Failure History

Figure 7:
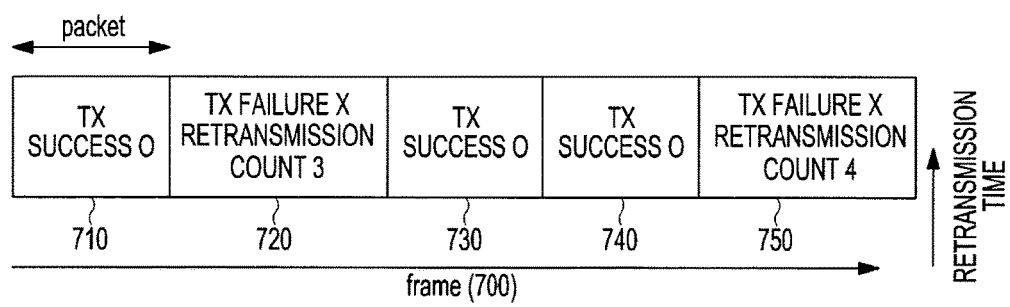
FIG. 7 illustrates an example of a beam setting method according to an embodiment of the present disclosure.

FIG. 7 illustrates an example of a beam setting method according to an embodiment of the present disclosure.

Referring to an example of the previous transmission success and failure histories in FIG. 7, the proposed beam setting method can include determining the number of transmission failures that have occurred in a frame 700 on the basis of a retransmission time within a predetermined time (e.g., the number of transmission failures can be determined by reference numerals 720 and 750), and the number of retransmissions (e.g., the number of retransmissions can be determined by reference numerals 710, 730 and 740). If the transmission failure is frequent, the proposed beam setting method can expand the beam width to increase the probability that the link can be connected.

Criteria C: Mobility

Figure 8:
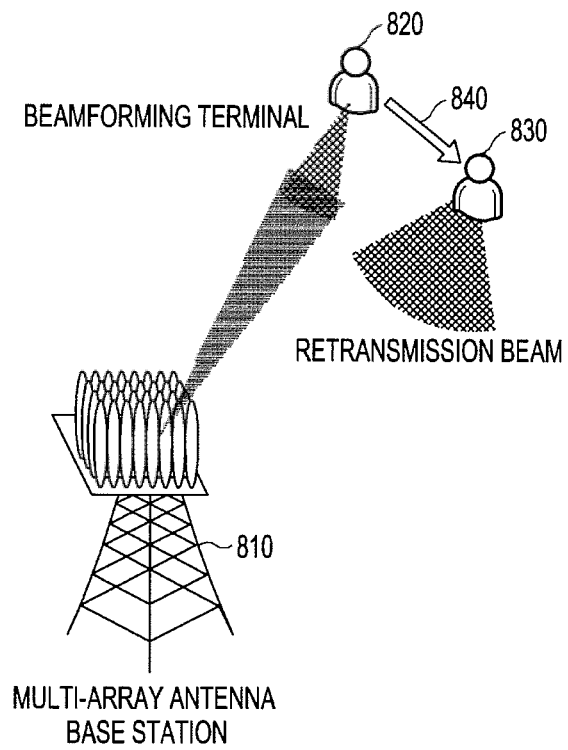
FIG. 8 illustrates an example of a beam setting method according to an embodiment of the present disclosure.

FIG. 8 illustrates an example of a beam setting method according to an embodiment of the present disclosure.

Determining a change in the beam direction and/or the beam width based on the mobility can be applied in all of the terminals 820 and 830 and the base station 810. The terminal and the base station can have several factors based on which they can determine their mobility. Therefore, if the mobility of the terminal and the base station is determined to be high, the beam width can be increased, and if the mobility of the terminal and the base station is determined to be low, the beam direction can be changed. FIG. 8 illustrates an example capable of increasing the beam width, if the mobility of the terminal is determined to be high.

Criteria D: Maximum Allowable Transmission Beam Width Serviceable in Receiver

Figure 9:
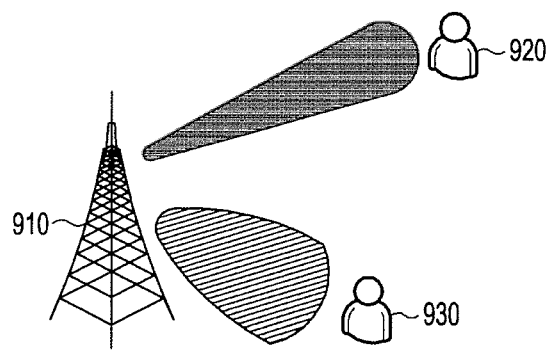
FIG. 9 illustrates an example of a beam setting method according to an embodiment of the present disclosure.

FIG. 9 illustrates an example of a beam setting method according to an embodiment of the present disclosure.

Since a transmission beam width and a beam gain are inversely proportional to each other, as the transmission beam width is narrower, the coverage can be wider. A base station 910 can search for the maximum allowable transmission beam width for each of terminals 920 and 930 before transmission, thereby reflecting information about the serviceable maximum allowable transmission beam width, in retransmission. The base station can transmit the beam having various beam widths by utilizing it as pilot information. The terminal can feed the information about the serviceable maximum allowable transmission beam width back to the base station, and if the terminal is a transmitter, the base station can utilize the information in the same way.

Using the above-described four Criteria A to D, the base station and the terminal can change the beam direction or the beam width during retransmission.

Figure 10:
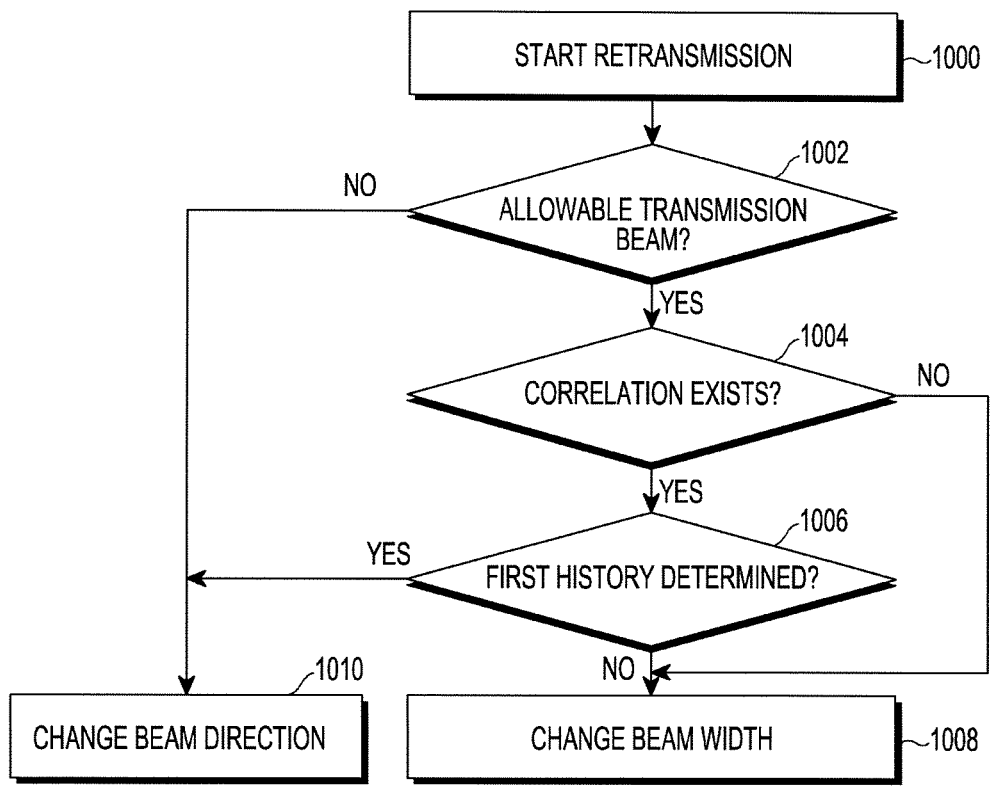
FIGS. 10 and 11 are flowcharts illustrating how to set a retransmission candidate beam, to which the first to third embodiments of the present disclosure can be applied.
Figure 11:
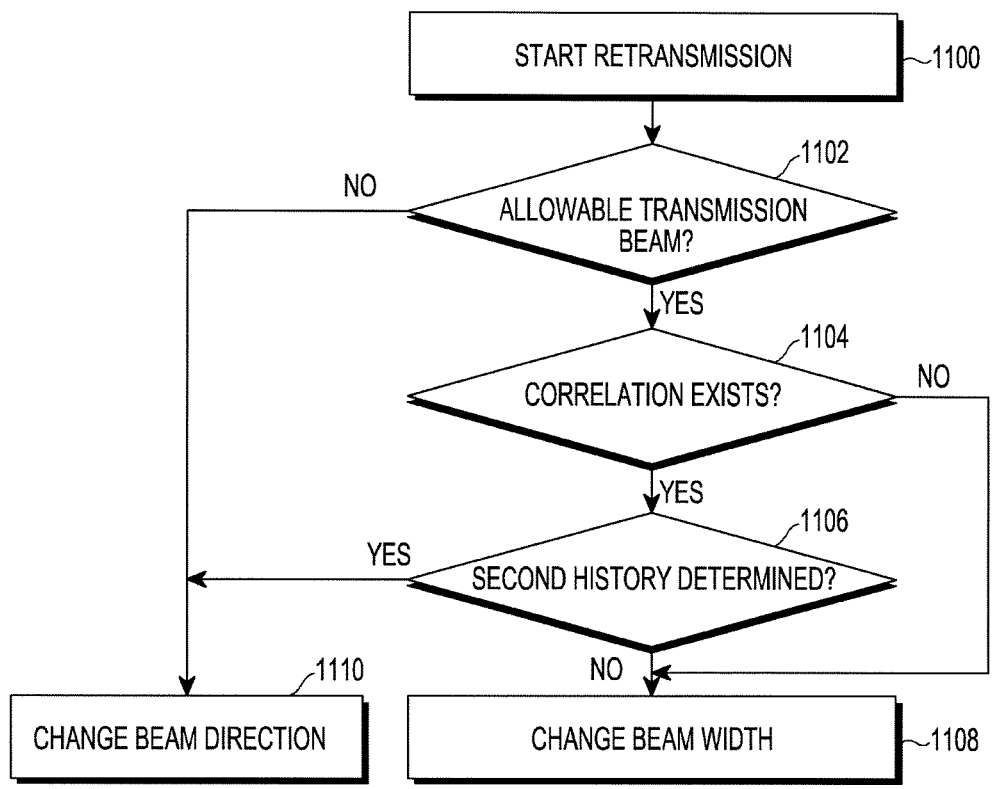

FIGS. 10 and 11 are flowcharts illustrating how to set a retransmission candidate beam, to which the first to third embodiments of the present disclosure can be applied.

Although FIGS. 10 and 11 will be described on the basis of a transmitter, the same can be applied even in a receiver.

Referring to FIG. 10, a transmitter can start retransmission in operation 1000. The transmitter can determine in operation 1002 whether a transmission beam is an allowable transmission beam. If the transmission beam is not an allowable transmission beam, the transmitter can change the beam direction in operation 1010. However, if the transmission beam is an allowable transmission beam, the transmitter can determine in operation 1004 whether there is a correlation between transmission and retransmission. If there is no correlation between transmission and retransmission, the transmitter can change the beam width in operation 1008.

The process of determining in operation 1004 whether there is a correlation can include a process of determining whether a length of an interval between transmission and/or retransmission is less than a threshold, and/or a process of determining whether the mobility of a terminal or a base station is less than a threshold.

However, if there is a correlation between transmission and retransmission, the transmitter can determine a first history in operation 1006. The process of determining a first history can correspond to Criteria A and B. For example, if a beam gain value of a candidate beam combination is greater than a threshold, or if the number of previous transmission failures and/or successes is less than a threshold, the transmitter can change the beam direction in operation 1010. However, if the beam gain value of a candidate beam combination is less than a threshold, or if the number of (previous transmission failures and/or successes is greater than a threshold, the transmitter can change the beam width in operation 1008.

Although operations 1002, 1004 and 1006 have been described in the "AND" concept in FIG. 10, the same can be applied in the "OR" concept. In other words, the transmitter can perform operation 1002, operation 1004 or operation 1006 after the retransmission start phase (or operation 1000), and the execution order of operation 1002, operation 1004 or operation 1006 can be changed in various ways.

FIG. 11 is similar to FIG. 10 except that the transmitter determines a second history in operation 1106. The second history can correspond to Criteria A or B. Another difference between FIG. 11 and FIG. 10 can consist in that the process of determining in operation 1104 whether there is a correlation includes only the process of determining whether a length of an interval between transmission and/or retransmission is less than a threshold.

Figure 12:
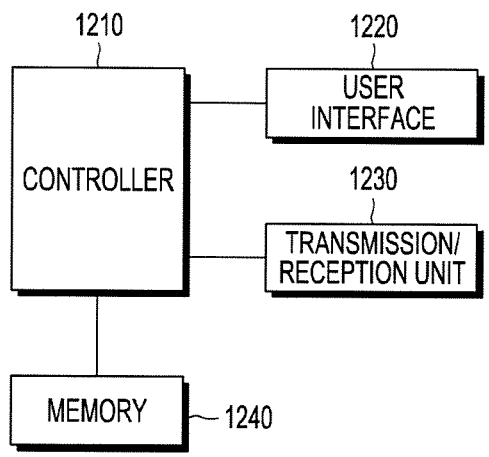
FIG. 12 is a block diagram illustrating a configuration of a terminal according to an embodiment of the present disclosure.

FIG. 12 is a block diagram illustrating a configuration of a terminal according to an embodiment of the present disclosure.

The terminal according to an embodiment of the present disclosure can be either a transmitter or a receiver.

The terminal can include a transmission/reception unit 1230, a controller 1210, a memory 1240 and a user interface 1220.

The transmission/reception unit 1230 can include a transmission module and a reception module, respectively, for transmitting and receiving data to/from a base station according to an embodiment of the present disclosure in a mobile communication system. Further, the transmission/reception unit 1230 can determine a change in the beam direction and/or the beam width according to an embodiment of the present disclosure, and transmit a message or signal for informing the base station or the terminal of the determination results. Further, the transmission/reception unit 1230 can feed information about the serviceable maximum allowable transmission beam width back to the base station.

The controller 1210 can change the beam width and/or the beam direction using the beam gain history of a candidate beam combination, the previous transmission failure history, the mobility and the like according to an embodiment of the present disclosure. The controller 1210 can change the beam width and/or the beam direction using information about the maximum allowable transmission beam width serviceable in the receiver.

The memory 1240 can store or extract various data that is required to set a beam according to an embodiment of the present disclosure in the mobile communication system.

The user interface 1220 can deliver the information that is input by the user's manipulation to the controller 1210, or provide the necessary information to the user under control of the controller 1210.

Figure 13:
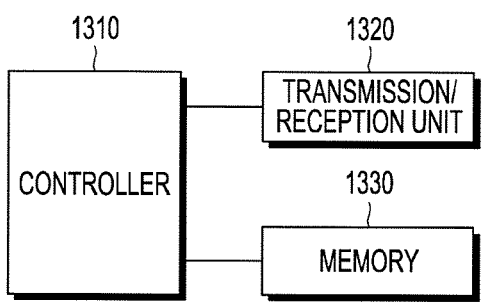
FIG. 13 is a block diagram illustrating a configuration of a base station according to a an embodiment of the present disclosure.

FIG. 13 is a block diagram illustrating a configuration of a base station according to an embodiment of the present disclosure.

The base station according to an embodiment of the present disclosure can be either a transmitter or a receiver.

Referring to FIG. 13, the base station can include a transmission/reception unit 1320, a memory 1330 and a controller 1310.

The transmission/reception unit 1320 can transmit and receive data to/from a terminal to set a beam according to an embodiment of the present disclosure in the mobile communication system.

The memory 1330 can store or extract various data that is required to set a beam according to an embodiment of the present disclosure in the mobile communication system.

The controller 1310 can change the beam width and/or the beam direction using the beam gain history of a candidate beam combination, the previous transmission failure history, the mobility and the like according to an embodiment of the present disclosure in the mobile communication system. The controller 1310 can change the beam width and/or the beam direction using information about the maximum allowable transmission beam width serviceable in the receiver.

The present disclosure proposes a scheme in which the transmitter and the receiver generate a beam advantageous to retransmission by changing the beam width and the beam direction in consideration of various environments, when performing retransmission. The applicable criteria can include a method for predicting the current beam gain using the previous beam gain history and a method for using the record of the past, such as a method for using the previous transmission failure history. Further, since the terminal has the mobility, the terminal can adjust the beam width and the beam direction based on the degree of the mobility. The base station can also adjust the beam width and the beam direction based on the degree of the mobility. Finally, the terminal can change the retransmission beam using the maximum allowable transmission beam width serviceable in the receiver.

Further, the present disclosure can make is possible to increase the retransmission success probability by adjusting the beam so as to increase the beam gain during retransmission in the mobile communication system that uses mmWave.

It can be appreciated that the beam setting method and apparatus can be implemented by hardware, software or a combination thereof in the wireless communication system according to an embodiment of the present disclosure. The software can be stored in a volatile or non-volatile storage device (e.g., a read only memory (ROM) regardless of whether it is erasable or rewritable), a memory (e.g., a random access memory (RAM), a memory chip, a memory device, or a memory integrated circuit (IC)), or an optically/magnetically writable machine (e.g., computer)-readable storage medium (e.g., a magnetic disc, a compact disc (CD), a digital versatile disc (DVD), or magnetic tape). In the wireless communication system according to an embodiment of the present disclosure, the beam setting method can be implemented by a computer or a mobile terminal that includes a controller and a memory, and the memory can be an example of the machine-readable storage medium suitable to store a program or programs including instructions for implementing embodiments of the present disclosure.

Therefore, the present disclosure can include a machine (computer)-readable storage medium storing a program or programs that includes the code for implementing the method and apparatus as defined by the appended claims. The program can be electrically carried on any medium such as a communication signal that is transmitted through wired or wireless connection.

Further, in the wireless communication system according to an embodiment of the present disclosure, the beam setting apparatus can receive the program from a program server that is connected to the beam setting apparatus by wires or wirelessly, and store the received program. The program server can include a memory for storing a program including instructions for performing the beam setting method in the wireless communication system, and storing the information required for the beam setting method in the wireless communication system, a communication unit for performing wired/wireless communication with the beam setting apparatus, and a controller for the program to the beam setting apparatus upon request or automatically.

As is apparent from the foregoing description, not only the transmitter but also the receiver can adaptively adjust the direction and width of the beam during retransmission to improve the retransmission effect in the mobile communication system that uses mmWave.

The present disclosure may increase the retransmission success probability by adjusting the beam so as to increase the beam gain, during retransmission in the mobile communication system that uses mmWave.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for setting a beam in a mobile communication system, the method comprising:
   determining at least one of a beam width or a beam direction in response to a failure of a random access attempt; and
   retransmitting a random access signal through a beam having the determined at least one of the beam width or the beam direction,
   wherein the determining is performed based on at least one of a beam gain history of a candidate beam combination or a previous transmission failure history comprising a frequency of failures of a random access attempt, and
   wherein the beam gain history of a candidate beam combination and the previous transmission failure history are used when a correlation between transmission and retransmission exists.

2. The method of claim 1, wherein at least one of the beam width and the beam direction is changed based on at least one of a number of antennas or an antenna array.

3. The method of claim 1, wherein the determining is performed using a mobility of a mobile device.

4. The method of claim 1, wherein the determining is performed using information about a serviceable maximum allowable transmission beam width.

5. The method of claim 4, wherein a transmission beam width is determined based on the information about the serviceable maximum allowable transmission beam width by searching for a maximum allowable transmission beam width for each terminal by a transmitter.

6. The method of claim 1, wherein the beam direction is changed by increasing a beam index.

7. The method of claim 1, wherein the beam direction is changed by decreasing a beam index.

8. The method of claim 1, wherein the beam width is increased in response to the failure of the random access attempt.

9. The method of claim 1, wherein once a transmitter changes the beam direction for a retransmission, a receiver changes its beam direction for receiving the retransmission.

10. An apparatus for setting a beam in a mobile communication system, the apparatus comprising:
a transceiver; and
a controller configured to:
 determine at least one of a beam width or a beam direction in response to a failure of a random access attempt; and
 retransmit, via the transceiver, a random access signal through a beam having the determined at least one of the beam width or the beam direction,
wherein the controller determines the at least one of the beam width or the beam direction based on at least one of a beam gain history of a candidate beam combination or a previous transmission failure history comprising a frequency of failures of a random access attempt wherein the beam gain history of a candidate beam combination and the previous transmission failure hi story are used when a correlation between transmission and retransmission exists.

11. The apparatus of claim 10, wherein at least one of the beam width and the beam direction is changed based on at least one of a number of antennas or an antenna array.

12. The apparatus of claim 10, wherein the controller determines the at least one of the beam width or the beam direction using a mobility of a mobile device.

13. The apparatus of claim 10, wherein the controller determines the at least one of the beam width or the beam direction using information about a serviceable maximum allowable transmission beam width.

14. The apparatus of claim 13, wherein the information about the serviceable maximum allowable transmission beam width is reflected in retransmission by searching for a maximum allowable transmission beam width for each terminal by a transmitter.

15. The apparatus of claim 10, wherein the beam direction is changed by increasing a beam index.

16. The apparatus of claim 10, wherein the beam direction is changed by decreasing a beam index.

17. The apparatus of claim 10, wherein the beam width is increased in response to the failure of the random access attempt.

18. The apparatus of claim 10, where once a transmitter is configured to change the beam direction for a retransmission, a receiver is configured to change its beam direction for receiving the retransmission.

* * * * *